United States Patent [19]

Liehr et al.

[11] 4,006,917
[45] Feb. 8, 1977

[54] ENERGY ABSORBING PULL HOOK FOR CONSTRUCTION VEHICLES

[75] Inventors: Douglas P. Liehr; Erich E. Drochner, both of Peoria, Ill.

[73] Assignee: Caterpillar Tractor Co., Peoria, Ill.

[22] Filed: July 14, 1975

[21] Appl. No.: 595,909

[52] U.S. Cl. .............................. 280/451; 172/271; 180/14.5; 188/1 C
[51] Int. Cl.² .......................................... B60D 1/00
[58] Field of Search ................. 280/449, 451, 515; 180/14.5; 188/1 C; 172/271

[56] References Cited

UNITED STATES PATENTS

| | | | |
|---|---|---|---|
| 2,284,145 | 5/1942 | Hansmann | 180/14.5 |
| 2,349,884 | 5/1944 | Rietz | 280/449 |
| 2,447,097 | 8/1948 | Silver | 280/449 |
| 2,509,459 | 5/1950 | Stamler | 280/515 X |
| 2,665,128 | 1/1954 | Guffey | 280/451 X |
| 2,682,931 | 7/1954 | Young | 188/1 C |
| 3,198,550 | 8/1965 | Tuft et al. | 280/449 |

*Primary Examiner*—Joseph F. Peters
*Assistant Examiner*—John A. Pekar
*Attorney, Agent, or Firm*—Phillips, Moore, Weissenberger, Lempio & Majestic

[57] ABSTRACT

A construction vehicle has a pull hook arrangement mounted on a rearward end of a frame thereof for towing purposes. Such arrangement comprises a pull hook and energy absorbing means normally secured between the frame and the pull hook and adapted to break-away from the frame when the load on the pull hook exceeds a predetermined magnitude. The energy absorbing means preferably comprises a tubular member which is tapered-down rearwardly to thereafter permit it to be drawn through an aperture formed in the frame to absorb energy thereby.

25 Claims, 3 Drawing Figures

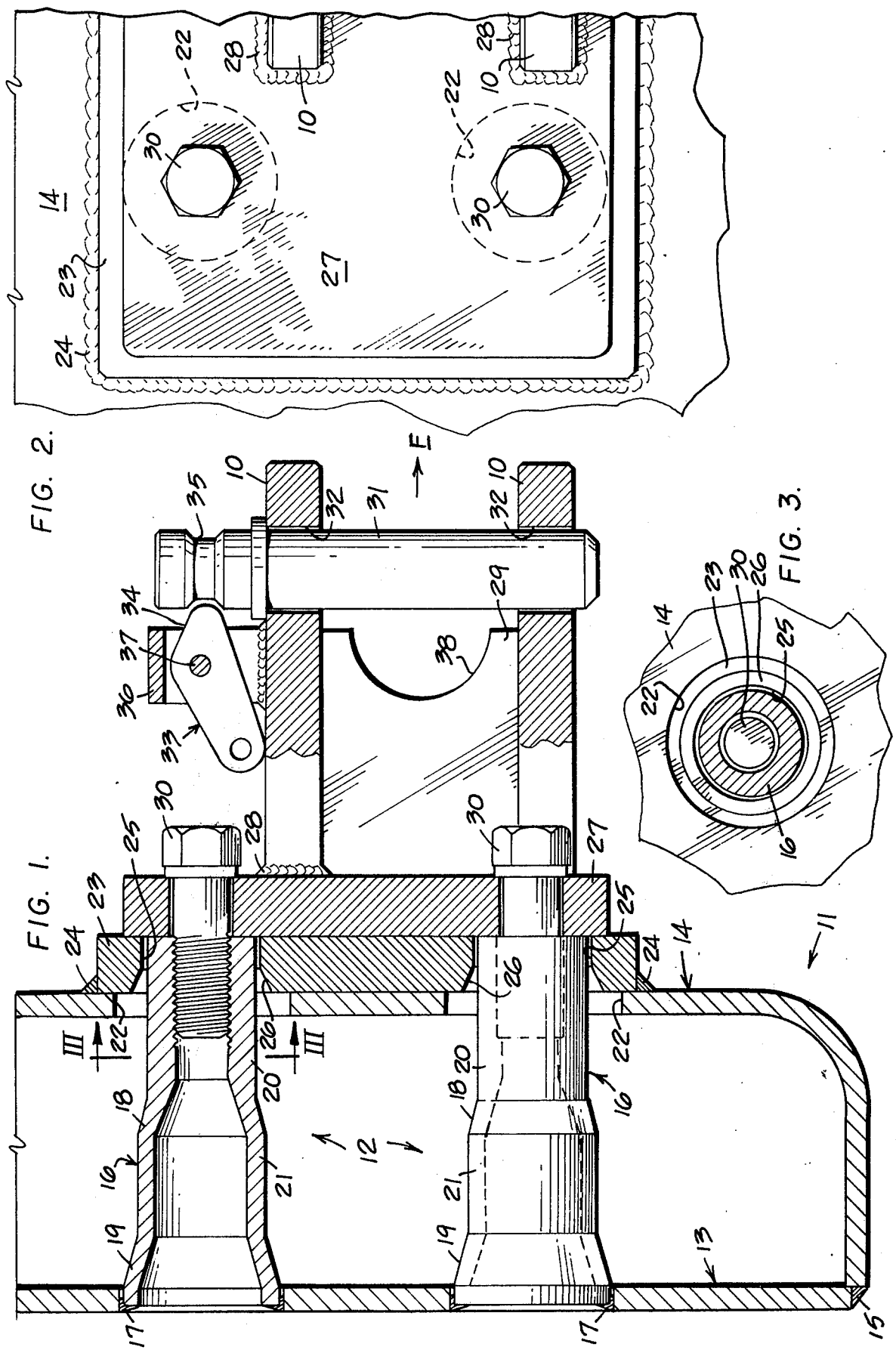

ENERGY ABSORBING PULL HOOK FOR CONSTRUCTION VEHICLES

BACKGROUND OF THE INVENTION

This invention relates to a pull hook arrangement for a construction vehicle, such as the track-type loader, which exhibits energy absorbing and safety desiderata. Conventional pull hooks are normally bolted, welded or otherwise secured to the frame of a construction vehicle to perform towing and related work operations. When an unduly high pulling load is imparted to the pull hook it will break-away from the frame abrubtly, without prior warning to the operator.

SUMMARY OF THIS INVENTION

An object of this invention is to provide a non-complex and economical energy absorbing means for absorbing energy upon the breaking-away of a pair of members from each other and for alerting a workman that such a condition may ensue. The energy absorbing means is particularly adapted for normally securing a pull hook to the frame of a construction vehicle. In the event that the pulling force on the pull hook exceeds a predetermined magnitude, the energy absorbing means will break-away from the frame and thereafter function to absorb pulling forces exceeding such predetermined magnitude. In the preferred embodiment of this invention, the latter function is achieved by a tapered tubular member employed in the energy absorbing means which is drawn through an aperture formed in the frame.

BRIEF DESCRIPTION OF THE DRAWING

Other objects of this invention will become apparent from the following description and accompanying drawing wherein:

FIG. 1 is a partially sectioned side elevational view of a pull hook arrangement embodying the energy absorbing means of this invention therein;

FIG. 2 is a rear elevational view of approximately one-half of the pull hook arrangement; and FIG. 3 is a sectional view, taken in the direction of arrows III—III in FIG. 1.

DETAILED DESCRIPTION

FIGS. 1 and 2 illustrates a pair of vertically spaced pull hooks 10 attached to the rearward end of a frame 11 of a construction vehicle, such as a track-type loader, by four energy absorbing means 12 of this invention (two shown). As will be hereinafter more fully understood, although the energy absorbing means is particularly adapted for such a pull hook application, the inventive features thereof are also applicable to the securance of other structural members together. In this regard, the energy absorbing means broadly functions to normally secure a pair of members together and to sequentially detach such means from one of the members when the other member is subjected to a pulling force of a predetermined magnitude and for thereafter progressively absorbing such pulling force.

Frame 11 may comprise a pair of spaced-apart first and second members 13 and 14, respectively, suitably secured together by a weld 15. Each energy absorbing means 12 comprises a tapered tubular member 16 having its rearward end secured to first or inboard member 13 by annular first weld means 17. The tubular member is preferably generally cylindrical and has a progressively enlarged outside diameter from a forward end to the rearward end thereof.

In particular, member 16 has a diameter of tapered or frusto-conically shaped portions 18 and 19 formed in longitudinally spaced relationship thereon. A first cylindrical portion 20 is formed on the forward end of the member whereas a second cylindrical portion 21 is disposed longitudinally between portions 18 and 19 to connect the same. The forward end of the tubular member projects through a circular aperture 22 formed through second or outboard member 14 of the frame to have an inside diameter which is slightly larger than the maximum outside diameter of the tubular member to facilitate installation of the pull hook arrangement as a unit on the frame.

Second frame member 14 has a rectangular plate 23 secured to an outboard side thereof by second weld means 24 to form an integral part of frame 11. A circular aperture 25, having an inside diameter slightly greater than the outside diameter of cylindrical portion 20 of the tubular member but less than the maximum outside diameter of portion 18 thereof, is formed through the plate. The aperture comprises a frusto-conically shaped recess 26 disposed on an inboard side of the second member in longitudinal opposition relative to the slightly larger frusto-conically shaped portion 18 of the tubular member.

The energy absorbing means further comprises a plate member 27 disposed on an outboard side of plate 23 of the frame. Pull hooks 10 are each suitably secured to the plate member by welds 28 and may be secured to each other by a pair of vertically disposed and laterally spaced reinforcing plates 29 (one shown) welded therebetween and to the plate member. A bolt 30 extends through the plate member and is threadably attached internally of tubular member 18. Although four of the above-described energy absorbing means are employed in the illustrated preferred embodiment of this invention (one such means being positioned adjacent to each corner of plate member 27), it should be understood that any desired number of such means may be employed for various energy absorbing applications.

During a towing operation, a pin 31 may be inserted in vertically aligned apertures 32 formed through pull hooks 10. The pin may be held in place by holding means comprising a pawl 33 having an arcuate cam portion 34 thereof engaged with an annular recess 35 formed on the pin. The pawl is pivotally mounted between a pair of brackets 35 (one shown), secured on the upper pull hook, by a pin 37. An arcuate releif 38 is preferably formed on plates 30 to accommodate a towing cable behind the pin.

The operational characteristics of the energy absorbing means will now be described. Upon towing of a second vehicle attached to pin 31 by a cable (not shown), a force F is imposed on the pull hooks which tend to pull them away from frame 11. Should the operator inadvertently impose a force of 50,000 lbs. on the pull hooks, for example, tubular members 16 will break-away from frame member 13 at weld means 17 and portions 18 thereof will engage recesses 26.

Further pulling forces will tend to draw each tubular member 16 through a respective aperture 25 to thereby absorb energy. Such drawing operation whereby the tubular member is at least substantially extruded into aperture 25 will require more force than that required to break weld means 24. Should the operator fail to visually or otherwise detect the progressive detachment of the pull hook from the frame, continued forces imposed on the pull hook will function to break weld means 24 upon imposition of a force of 100,000 lbs. on the pull hook, for example.

Thus, weld means 24 preferably has a breaking strength which is greater than that of weld means 17. It should be further noted that the pull hook arrangement is preferably designed to break welds 28, securing the pull hooks to plate member 27, prior to a shearing of bolts 30 to release the plate member from the frame. Also, it should be noted from the above description that each of the progressive breaking steps are gradual, i.e., not sudden, whereby the operator is able to visually note the same. Furthermore, individual breaking up of the component parts of the pull hook arrangement is prevented to thus prevent any potential flying objects.

I claim:

1. An energy absorbing and safety pull hook arrangement in combination with a construction vehicle having a frame defining an aperture thereon comprising
a pull hook, and
energy absorbing means normally secured between said frame and said pull hook and disposed in alignment with said aperture for being sequentially detached from said frame when pulling forces imposed on said pull hook to pull it away from said frame exceed a predetermined magnitude and for thereafter progressively absorbing said pulling forces when they exceed said predetermined magnitude by being drawn through said aperture.

2. The pull hook arrangement of claim 1 wherein said frame comprises a pair of spaced-apart first and second members and wherein said means is normally welded to said first member.

3. The pull hook arrangement of claim 2 wherein said second member has said aperture formed therethrough and wherein said means comprises a tubular member having a rearward end thereof welded to said first member and a forward end thereof normally disposed in said aperture.

4. The pull hook arrangement of claim 3 wherein said tubular member has progressively enlarged outside dimensions from the forward end to the rearward end thereof with said forward and rearward ends having outside dimensions that are less and more than the inside dimension of said aperture, respectively, whereby upon breaking of said tubular member from said first member and tubular member will be drawn into said aperture to absorb energy thereby.

5. The pull hook arrangement of claim 4 wherein said aperture is circular and wherein said tubular member has a circular cross section of varying outside diameters throughout its entire length.

6. The pull hook arrangement of claim 5 wherein said tubular comprises at least one frusto-conically shaped portion formed thereon.

7. The pull hook arrangement of claim 6 wherein a pair of said frusto-conically shaped portions are formed in longitudinally spaced relationship on said tubular member along with a first cylindrical portion formed on the forward end of said tubular member and a second cylindrical portion disposed longitudinally between said pair of frusto-conically shaped portions.

8. The pull hook arrangement of claim 3 wherein said means further comprises a plate member disposed on an outboard side of said second member and having said pull hook secured thereto and a bolt extending through said plate member and threadably attached to said tubular member.

9. The pull hook arrangement of claim 8 wherein at least one pair of said tubular members are secured to said first member and are each attached to said plate member by a said bolt.

10. The pull hook arrangement of claim 4 wherein said tubular member is secured to said first member by first weld means and wherein said second member comprises a pair of inner and outer members secured together by second weld means having a breaking strength greater than said first weld means.

11. The pull hook arrangement of claim 5 wherein the aperture formed through said second member comprises a frusto-conically shaped recess disposed on an inboard side of said second member in longitudinally opposition relative to and sized smaller than the frusto-conically shaped portion of said tubular member.

12. The pull hook arrangement of claim 1 wherein a vertically spaced pair of said pull hooks are secured to said energy absorbing means.

13. The pull hook arrangement of claim 12 further comprising a pin disposed in a pair of vertically aligned apertures formed in said pull hooks and holding means mounted on an upper one of said pull hooks to engage and hold said pin in position.

14. The pull hook arrangement of claim 13 wherein said holding means comprises a pawl pivotally mounted on said upper pull hook and having a portion thereof engaged within an annular recess formed on said pin.

15. An energy absorbing arrangement comprising a first member having an aperture defined therein, a second member and energy absorbing means normally securing said first and second members together and for being sequentially detached from said first member when pulling forces imposed on said second member to pull it away from said first member exceed a predetermined magnitude and for thereafter progressively absorbing said pulling forces when they exceed said predetermined magnitude, said means comprising a tubular member disposed in alignment with said aperture and having a rearward end thereof welded to said first member and a bolt threadably attaching said second member to a forward end of said tubular member.

16. The energy absorbing arrangement of claim 15 wherein said first member comprises a pair of spaced-apart inboard and outboard members and wherein the rearward end of said tubular member is welded to said inboard member.

17. The energy absorbing arrangement of claim 16 wherein said outboard member has said aperture formed therethrough and wherein the rearward end of said tubular member is welded to said inboard member and the forward end thereof is normally disposed in said aperture.

18. The energy absorbing arrangement of claim 17 wherein said tubular member has progressively enlarged outside dimensions from the forward end to the rearward end thereof with said forward and rearward ends having outside dimensions that are less and more than the inside dimension of said aperture, respectively, whereby upon breaking of said tubular member from said inboard member said tubular member will be drawn into said aperture to absorb energy thereby.

19. The energy absorbing arrangement of claim 18 wherein said aperture is circular and wherein said tubular member has a circular cross section of varying outside diameters throughout its entire length.

20. The energy absorbing arrangement of claim 19 wherein said tubular member comprises at least one frusto-conically shaped portion formed thereon.

21. The energy absorbing arrangement of claim 20 wherein a pair of said frusto-conically shaped portions are formed in longitudinally spaced relationship on said tubular member along with a first cylindrical portion formed on the forward end of said tubular member and a second cylindrical portion disposed longitudinally between said pair of frusto-conically shaped portions.

22. The energy absorbing arrangement of claim 17 wherein said means further comprises a plate member disposed on an outboard side of said outboard member and having said second member welded thereto and wherein said bolt extends through said plate member and is threadably attached to said tubular member.

23. The energy absorbing arrangement of claim 22 wherein at least one pair of said tubular members welded secured to said inboard member and are each attached to said plate member by a said bolt.

24. The energy absorbing arrangement of claim 18 wherein said tubular member is secured to said inboard member by first weld means and wherein said outboard member comprises a pair of inner and outer members secured together by second weld means having a breaking strength greater than said first weld means.

25. The energy absorbing arrangement of claim 19 wherein the aperture formed through said outboard member comprises a frusto-conically shaped recess disposed on an inboard side of said outboard member in longitudinal opposition relative to and sized smaller than the frusto-conically shaped portion of said tubular member.

* * * * *